(12) United States Patent
Tulett

(10) Patent No.: US 9,459,361 B2
(45) Date of Patent: Oct. 4, 2016

(54) FACILITATING OPERATION OF A SEISMIC SOURCE

(75) Inventor: John Richard Tulett, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 931 days.

(21) Appl. No.: 13/334,063

(22) Filed: Dec. 22, 2011

(65) Prior Publication Data
US 2013/0163375 A1 Jun. 27, 2013

(51) Int. Cl.
*G01V 1/38* (2006.01)

(52) U.S. Cl.
CPC ........... *G01V 1/3808* (2013.01); *G01V 1/3817* (2013.01); *G01V 1/3835* (2013.01); *G01V 2210/161* (2013.01)

(58) Field of Classification Search
CPC .... G01V 1/38; G01V 1/3808; G01V 1/3835; G01V 1/3817; G01V 2210/161
See application file for complete search history.

(56) References Cited

U.S. PATENT DOCUMENTS

| | | | |
|---|---|---|---|
| 4,558,437 A | 12/1985 | Meeder et al. | |
| 5,649,843 A * | 7/1997 | Elger | 440/38 |
| 6,167,831 B1 * | 1/2001 | Watt et al. | 114/322 |
| 6,799,528 B1 | 10/2004 | Bekker | |
| 6,848,382 B1 | 2/2005 | Bekker | |
| 7,339,852 B2 | 3/2008 | Gordy et al. | |
| 7,974,150 B2 | 7/2011 | Tulett et al. | |
| 8,183,868 B2 * | 5/2012 | Summerfield et al. | 324/334 |
| 2004/0228214 A1 | 11/2004 | Tulett | |
| 2007/0230268 A1 * | 10/2007 | Hoogeveen et al. | 367/19 |
| 2008/0205191 A1 * | 8/2008 | Coste et al. | 367/15 |
| 2009/0279386 A1 | 11/2009 | Monk | |
| 2009/0285051 A1 | 11/2009 | Poitzsch et al. | |

FOREIGN PATENT DOCUMENTS

GB 2246104 1/1992

OTHER PUBLICATIONS

Tulett HSE Horizon, "Borehole Seismic Air-Gun Sources: What's the Safe Distance from a Ship Hull?", May 2003, pp. 32-37.*
J.R. Tulett, "Borehole Seismic Air-Gun Sources: What's the Safe Distance from the Ships Hull?", SPE 74177, 2002.
International Search Report for the equivalent PCT patent application No. PCT/US2012/070220 issued on Apr. 16, 2013.
Partial European Search Report issued in related EP application 12858961.1 on Aug. 10, 2016, 7 pages.

* cited by examiner

*Primary Examiner* — Luke Ratcliffe
*Assistant Examiner* — Hovhannes Baghdasaryan
(74) *Attorney, Agent, or Firm* — Daryl Wright

(57) ABSTRACT

A technique facilitates use of a seismic source when deployed in-sea via a vessel. Shock levels acting on the vessel (or other body) due to firing of a seismic source and/or the separation distance of the seismic source from the vessel may be monitored during firing of the seismic source. The data is relayed to a control system which may be used to adjust operation of the seismic source when the shock levels acting on the vessel and/or the separation distance between the vessel and the seismic source cross a predetermined threshold.

8 Claims, 4 Drawing Sheets

FACILITATING OPERATION OF A SEISMIC SOURCE

BACKGROUND

Hydrocarbon fluids such as oil and natural gas are obtained from a subterranean geologic formation, referred to as a reservoir, by drilling a well that penetrates the hydrocarbon-bearing formation. Knowing where the reservoir is located and the type of geological formation containing the reservoir is valuable in determining where to drill and in deciding how to efficiently produce the reservoir. One method of mapping the area around a borehole uses an acoustic source to produce acoustic source signals and acoustic receivers to receive the acoustic source signals. As the acoustic signals travel through the geological formations, their profiles are altered and then received by the acoustic receivers. By processing the waveforms and acoustic signals detected by the receivers, a representative indication of the location, composition, and extent of various geological formations may be obtained. As petroleum exploration occurs in deeper wells and in more complex subsurface formations, more powerful air-gun sources have been deployed to deliver acceptable seismic signal quality. The larger air-gun sources can produce substantial shock loads on the hull of a seismic vessel.

SUMMARY

In general, the present disclosure provides a technique which facilitates the use of a seismic source deployed in-sea from a vessel or other marine body. Shock levels acting on the vessel (or other body) due to firing of a seismic source and/or the separation distance of the seismic source from the vessel may be monitored during firing of the seismic source. The data is relayed to a control system which may be used to automatically adjust the operation of the seismic source when the shock levels acting on the vessel and/or the separation distance between the vessel and the seismic source cross a predetermined threshold.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate only the various implementations described herein and are not meant to limit the scope of various technologies described herein, and.

DETAILED DESCRIPTION

In the following description, numerous details are set forth to provide an understanding of some illustrative embodiments of the present disclosure. However, it will be understood by those of ordinary skill in the art that the system and/or methodology may be practiced without these details and that numerous variations or modifications from the described embodiments may be possible.

The disclosure herein generally relates to a system and methodology utilizing at least one seismic source deployed in a marine environment at a distance from a body, e.g. a vessel. For example, a large seismic source, such as a large air-gun seismic source, may be deployed in-sea from a vessel and certain parameters may be monitored during firing of the seismic source. For example, shock levels acting on the vessel due to firing of the at least one seismic source may be monitored. Additionally or alternatively, the separation distance of the seismic source from the vessel may be monitored during deployment and/or firing of the seismic source. The monitored data is relayed to a control system which determines whether any of the certain parameters have crossed a predetermined threshold. The control system also may be used to automatically adjust operation of the seismic source when a threshold is crossed. For example, the control system may shut down firing of the seismic source when shock levels acting on the vessel and/or the separation distance between the vessel and the seismic source cross corresponding, predetermined thresholds.

In some applications, the seismic system enhances the capability for using larger seismic sources, e.g. larger air-gun sources, by providing protections for the vessel hull or other body. For example, the system may be designed so the seismic sources are positioned out to at least a predetermined distance from the vessel hull to minimize shock loading during firing of the seismic source. In some applications, the seismic system may be designed to provide automatic shut-down of the seismic source firing system if the seismic source, e.g. air-guns, is at a distance less than the predetermined distance from the hull. In some applications, the system also may be designed to provide automatic shut-down of the seismic source firing system if shock loading on the vessel hull is higher than the predetermined, e.g. allowed, shock loading for a given vessel hull.

Figure 1:
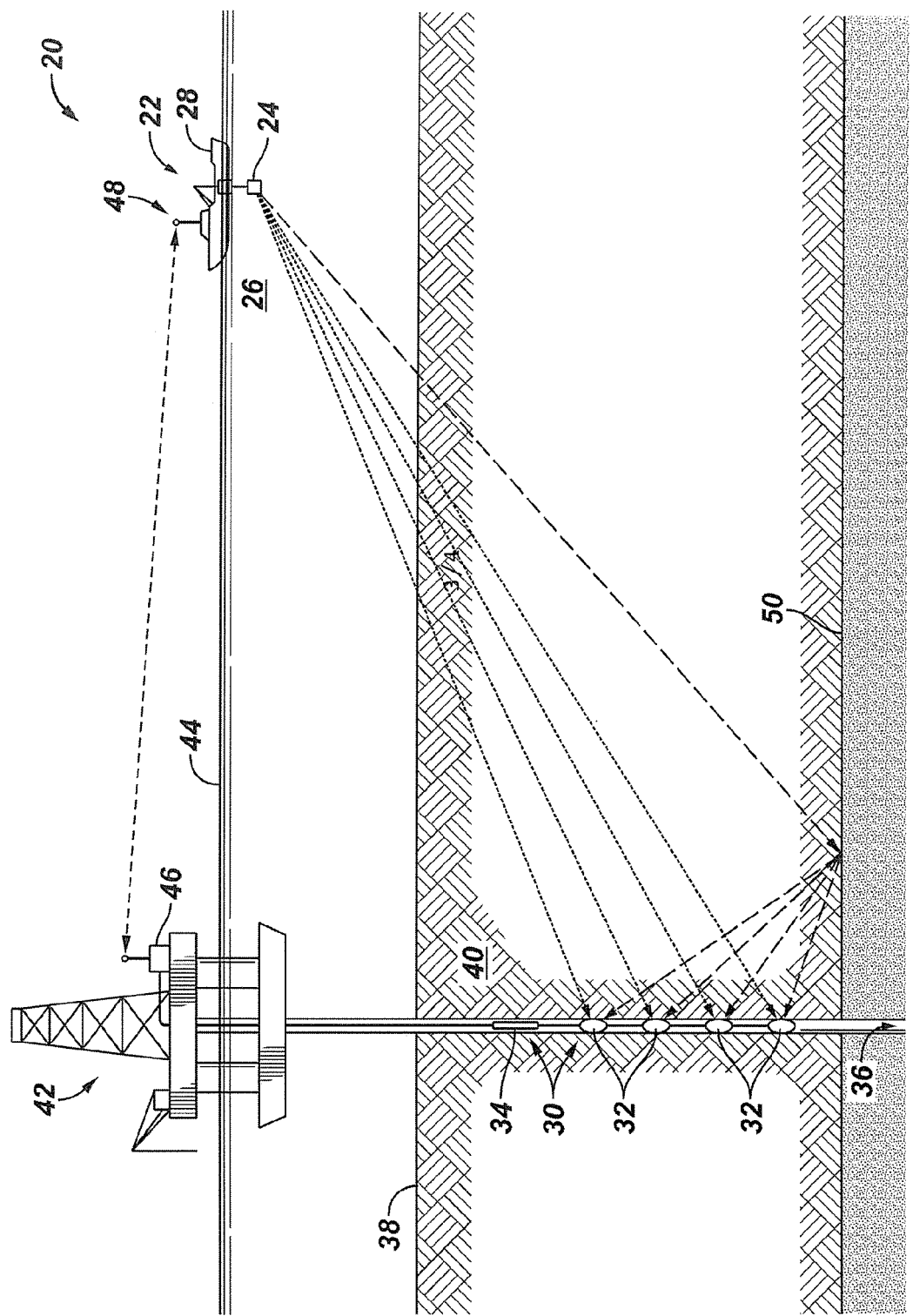
FIG. 1 is a schematic illustration of a seismic profiling system and application, according to an embodiment of the disclosure.

Referring generally to FIG. 1, an example of one type of application utilizing a seismic system is illustrated. The example is provided to facilitate explanation, and it should be understood that a variety of seismic systems may be used in marine vertical seismic profiling applications and in other types of seismic profiling applications, e.g. surface seismic profiling applications. The various seismic system components and systems may be located at a variety of positions and in many types of environments depending on the scope and design of the seismic profiling application.

Referring generally to FIG. 1, an example of one type of seismic profiling application and system is illustrated. In FIG. 1, an embodiment of a seismic system 20 is illustrated as comprising a body, e.g. a vessel, 22 for deploying a seismic source 24 in-sea in a marine environment 26. The seismic source 24 may comprise an individual source or a plurality of sources, such as an individual air-gun source or a plurality of air-gun sources deployed as a group. However, seismic source 24 may comprise a variety of other types of individual or plural seismic sources such as electrical discharge (sparker) seismic sources or marine vibrator seismic sources. The seismic source 24 is deployed at a desired distance from a hull 28 of the body/vessel 22, as described in greater detail below.

In the example illustrated, the seismic system 20 further comprises a seismic receiver system 30 having a plurality of seismic receivers 32 coupled with a telemetry unit 34. By way of example, the seismic receivers 32 and the telemetry unit 34 may be deployed downhole in a wellbore 36 extending down from a sea bottom 38 into a subterranean formation 40. In this type of application, the wellbore 36 may be located generally beneath an offshore rig 42 disposed at a surface location 44. The offshore rig 42 may be connected with the wellbore 36 via a riser or other suitable construction. Additionally, the offshore rig 42 may comprise a variety of other systems and components, such as a seismic acquisition and logging unit 46. The seismic acquisition and logging unit 46 may be placed in communication with a corresponding communication system 48 on vessel 22 via a suitable telemetry technique, e.g. a synchronization and radio communication technique.

When seismic source 24 is fired, the seismic signal is reflected off a reflection boundary or boundaries 50 in subterranean formation 40. The seismic signal and the reflected seismic signal are received by the seismic receivers 32 which relay the data to telemetry unit 34. In turn, the telemetry unit 34 relays the seismic data to the seismic acquisition and logging unit 46 for processing and evaluation according to a selected seismic analysis technique.

Figure 2:
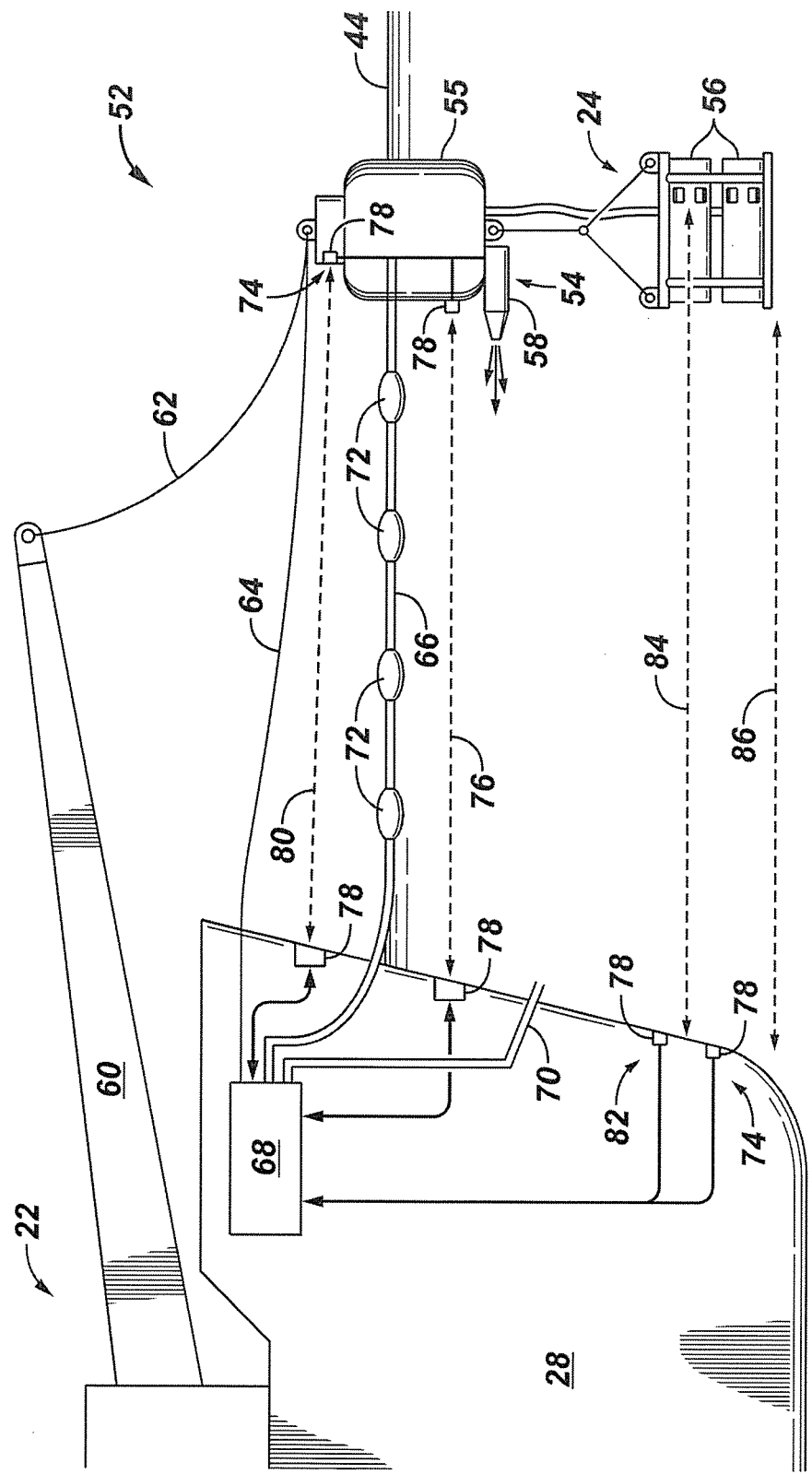
FIG. 2 is a schematic illustration of a seismic source deployed from a corresponding body, e.g. vessel, according to an embodiment of the disclosure.

Referring generally to FIG. 2, an example of a seismic source system 52 is illustrated. The seismic source system 52 enables use of larger seismic sources 24 by controlling the position of the seismic source 24 and/or monitoring the shock levels resulting from firing of the seismic source 24. By way of example, the seismic source system 52 utilizes a propulsion system 54 coupled to the seismic source 24. Although the propulsion system 54 may be coupled to the seismic source 24 according to a variety of techniques, one method couples the propulsion system 54 to a float 55 from which the seismic source 24 is suspended, as illustrated. The seismic source 24 may comprise an individual source or a plurality of sources, such as the illustrated plurality of suspended air-guns 56 or other suitable seismic sources. Furthermore, the propulsion system 54 is illustrated as comprising a thruster 58, such as a power thruster or a water jet, although other propulsion systems may be employed to move the seismic source 24 relative to the hull 28 of the body/vessel 22. Furthermore, the power thruster or water jet thruster 58 may comprise a plurality of power thrusters/water jet thrusters positioned at various locations and orientations to facilitate movement of seismic source 24 and control over seismic source 24 as it is moved through the sea to a desired location relative to hull 28.

In the example illustrated, the seismic source 24 may be deployed from vessel 22 via an appropriate deployment mechanism 60, such as a crane. However, other types of deployment mechanisms 60 also may be employed, e.g. davits, L-frames, and Z-frames. The seismic source 24 may be coupled with vessel 22 via a line 62, e.g. a cable, extending from the crane 60, although an added tag line (or lines) 64 also may be coupled between the seismic source 24 and the vessel 22.

Additionally, an umbilical 66 may be coupled between the seismic source 24 and the vessel 22. By way of example, the umbilical 66 may be connected between a power and control system 68, located on vessel 22, and float 55. The umbilical 66 is used to carry, for example, electrical and/or fluid signals. In some applications, the umbilical 66 is used to carry firing control signals and data between the power and control system 68 and seismic source 24. However, the umbilical 66 also may be used to control flow of power fluid to propulsion system 54. For example, propulsion system 54 may be powered by high-pressure air or pressurized water, e.g. seawater. In the example illustrated, the power and control system 68 draws in seawater through an intake 70, pressurizes the seawater, and delivers the seawater to thrusters 58 via umbilical 66. In some applications, the umbilical 66 is coupled with umbilical floats 72 to enable the umbilical to float along the sea surface 44.

The seismic source system 52 further comprises a sensor system 74 designed to monitor various parameters related to, for example, position and firing effects with respect to the seismic source 24. By way of example, the sensor system 74 may comprise an in-sea sensor system 76 having a plurality of sensors 78 which measure the distance between the hull 28 and the seismic source 24 in-sea. The sensor system 74 also may comprise an above-sea sensor system 80 having a plurality of sensors 78 which measure the distance between the hull 28 and the seismic source 24 above-sea. The sensor system 74 further comprises a shock level sensor system 82 having sensors 78 designed to sense shock levels in hull 28. By way of example, the shock level sensor system 82 may comprise a sensor or sensors 78 in the form of vibration sensors mounted inside hull 28. However, various strain sensors and other types of sensors may be used on hull 28 or at another suitable location to monitor shock levels acting on hull 28 of vessel 22. Similarly, the in-sea sensor system 76 and the above-sea sensor system 80 may comprise a variety of types, such as sonar-based sensors, infrared sensors, optical sensors, radio frequency sensors, and other types of sensors designed to monitor the distance between hull 28 and seismic source 24.

Seismic source system 52 is useful for utilizing an offset seismic source in a variety of seismic profiling operations and is operable with many types of offshore supply vessels. The system facilitates fast rigging and de-rigging while limiting or eliminating the potential for tangling of umbilical lines. The system 52 is operable in both side and stern deployment with respect to the vessel 22 and is operable in both towed and non-towed operations. Power and control system 68 also provides control over positioning seismic source 24 to maintain the seismic source at a desired distance from hull 28. For example, sensor system 74 can be used to monitor a hull to source distance 84 between hull 28 and seismic source 24, and system 68 can be used to maintain the hull to source distance 84 above a threshold, predetermined safe hull distance 86. Similarly, shock level sensor system 82 may be used to provide data to power and control system 68 and based on this data, system 68 maintains seismic source 24 at a distance such that firing of the seismic source maintains shock levels in hull 28 beneath a predetermined threshold.

The design of seismic source system 52 also facilitates operations in rough sea conditions and in a variety of other environmental conditions and applications. In at least some of those applications, power and control system 68 may be used, e.g. programmed, to provide automatic shut-down of the seismic source firing if certain parameter thresholds are crossed. By way of example, system 68 may be a computer-based system programmed to automatically shut down the firing of seismic source 24 if the hull to source distance 84 is less than the predetermined distance 86. The system 68 also may be programmed to shut down firing of the seismic source 24 if the shock loading on the vessel hull 28 is higher than the predetermined, e.g. allowed, shock loading during firing of seismic source 24.

Figure 3:
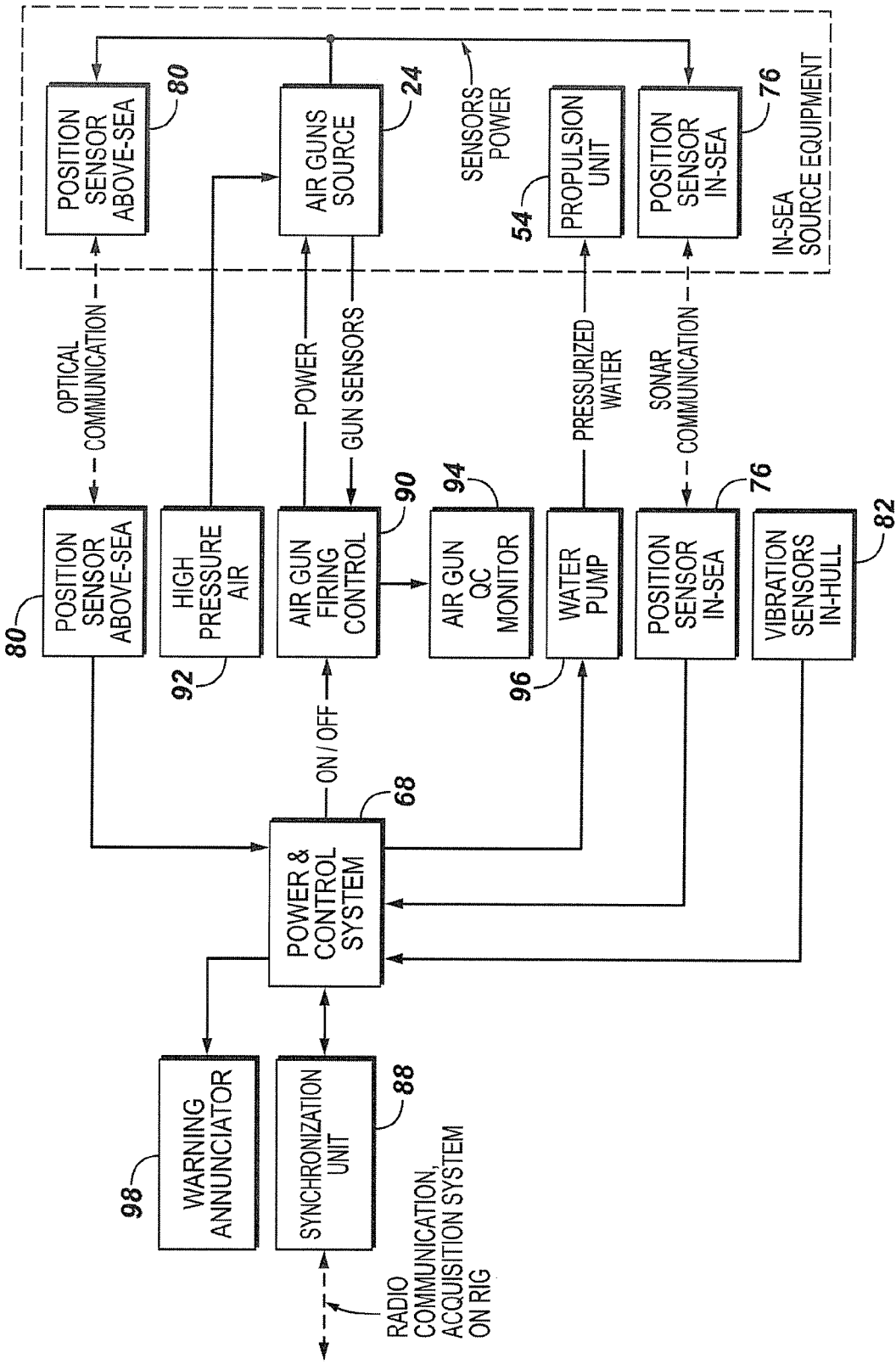
FIG. 3 is a schematic illustration of a control system for the seismic system, according to an embodiment of the disclosure.

Referring generally to FIG. 3, an example of a control regimen for utilizing power and control system 68 is illustrated schematically. It should be noted that FIG. 3 provides an example to facilitate explanation regarding exercising control over seismic source system 52 but a variety of other control schemes may be utilized. In the specific example illustrated, power and control system 68 is coupled with a synchronization unit 88 of corresponding communication system 48. As discussed above, corresponding communication system 48 is designed to communicate with seismic acquisition and logging unit 46 which may be located on, for example, offshore rig 42. Synchronization and firing data is sent from seismic acquisition and logging unit 46 to synchronization unit 88 to provide the desired synchronized firing of seismic source 24.

During a seismic profiling application, data also is provided to power and control system 68 by above-sea position sensor system 80, in-sea position sensor system 76, and shock level sensor system 82. By way of example, shock level sensor system 82 may be a vibration sensor system utilizing vibration sensors 78 located on or in hull 28. If the data supplied to power and control system 68 from sensor systems 76, 80 and 82 indicates seismic source 24 is operating as desired with respect to the predetermined threshold, e.g. distance and shock level thresholds, system 68 maintains firing of seismic source 24. In the application illustrated, the power and control system 68 may be coupled with a firing control 90, such as an air-gun firing control or other seismic source firing control. The firing control 90 receives data from seismic source 24, e.g. data from air-gun sensors, and provides power to the seismic source 24. In air-gun applications, system 68 also may be used to control a high pressure air system 92 which supplies high pressure air to air-guns 56 of seismic source 24. In some applications, system 68 also may be used to control and/or obtain data from a quality-control monitor system 94.

The unique design of seismic source system 52 also enables the power and control system 68 to position the seismic source 24 at increased distances from hull 28 by controlling propulsion system 54. Propulsion system 54 is controlled based on hull to source distance data obtained from position sensor systems 76 and 80. If the propulsion system 54 uses water jet thrusters 58, for example, the power and control system 68 may be coupled to a water pump 96 which supplies pressurized water to the water jet thrusters 58 of propulsion system 54. Directional control over the propulsion system 54 and thus over seismic source 24 may be achieved by controlling the flow of fluid to individual thrusters 58 of a plurality of thrusters and/or by controlling directional devices, such as rudders or other steering elements.

However, if the hull to source distance 84 decreases to a distance less than the threshold predetermined distance 86 and/or if the shock levels in hull 28 exceed a predetermined threshold, power and control system 68 may be used to turn off firing control 90. Turning off firing control 90 shuts down further firing of seismic source 24 until corrective action can be taken. A warning annunciator 98 also may be coupled to power and control system 68 to provide audible, visual, and/or other types of warnings to a system operator.

Figure 4:
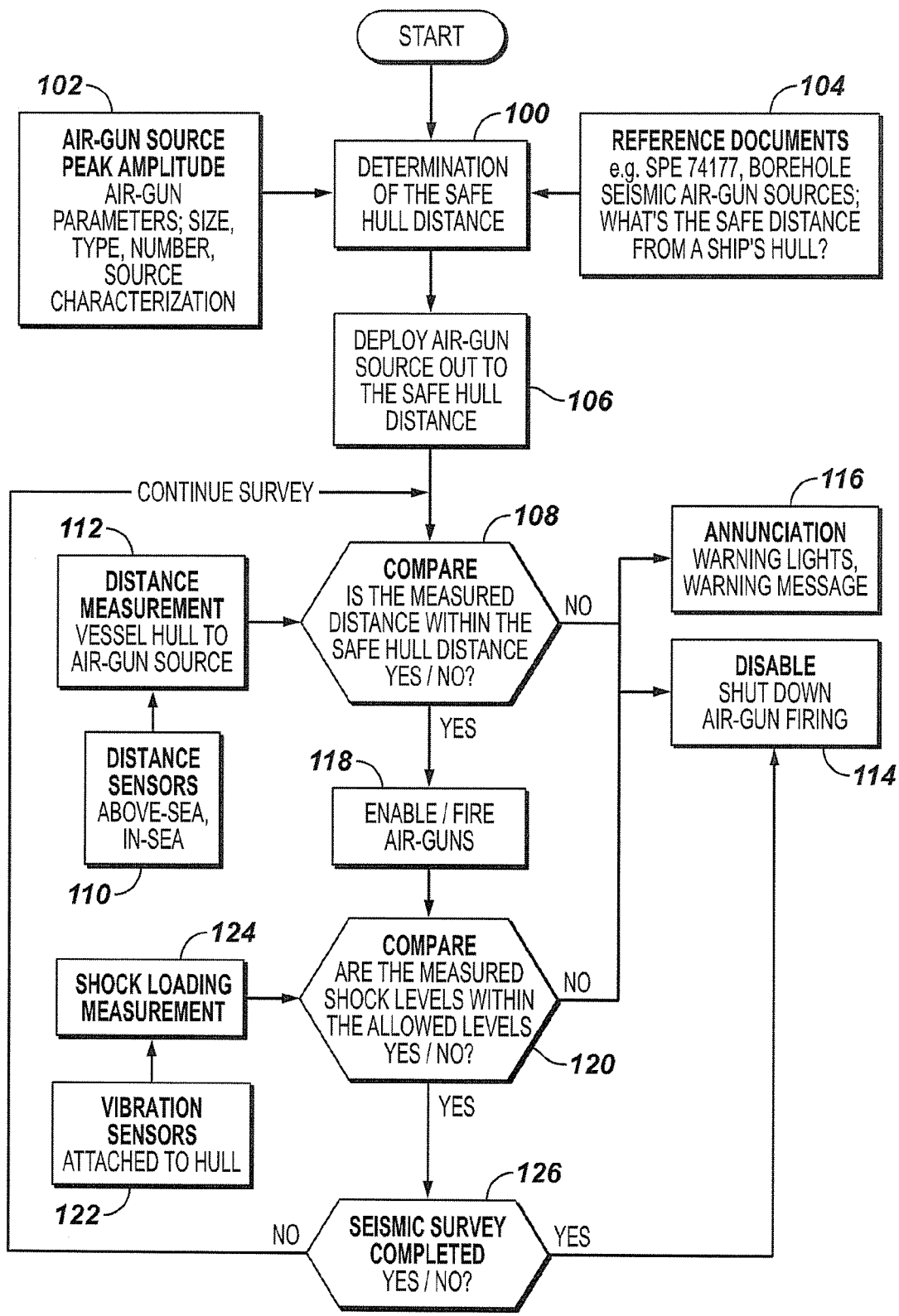
FIG. 4 is a flowchart illustrating an example of one approach for utilizing the seismic system, according to an embodiment of the disclosure.

In an operational example, seismic source system 52 is used for deploying and retrieving the seismic source 24; for positioning and maintaining the seismic source 24 at a desired position; and for automatically shutting down the seismic source firing system if certain thresholds are crossed. As illustrated in the flowchart example of FIG. 4, the safe hull distance 86 may initially be determined, as indicated by block 100. The predetermined hull distance 86 can be established by a variety of available data and resources, such as seismic source characteristics as indicated by block 102. Examples of relevant seismic source characteristics may comprise air-gun size, type, number, and source characterization as well as peak amplitude data. Other factors used to establish the predetermined hull distance 86 may comprise a variety of available reference documents as indicated by block 104. An example of such a document is SPE 74177, "*Borehole Seismic Air-Gun Sources: What's the Safe Distance from the Ships Hull?*" J. R. Tulett et al., Society of Petroleum Engineers Inc. (2002).

After establishing the predetermined hull distance 86, the seismic source 24 is deployed, as indicated by block 106. By way of example, the seismic source 24 may be removed from a storage position on the vessel 22 by deployment mechanism/crane 60 and transferred into the sea. The deployment function may include deployment of the seismic source 24 along with the handling and protection of umbilical 66 and water hoses for propulsion system 54. Retrieval of the seismic source 24 may be performed according to a similar procedure but in reverse order.

Once the seismic source 24 is deployed into the sea, power and control system 68 (in cooperation with propulsion system 54) is used to position and maintain the seismic source 24 in-sea at a distance equal to or greater than the predetermined safe hull distance 86. In this example, position sensor systems 76 and 80 are used to provide data to power and control system 68 so that a determination may be made whether the seismic source 24 is positioned at or beyond the predetermined hull distance 86, as indicated by decision block 108. As illustrated by block 110, the in-sea sensor system 76 and/or the above-sea sensor system 80 are designed to continually provide data related to the distance between hull 28 and seismic source 24. The data is processed by power and control system 68 to determine the hull to source distance 84 and to determine whether this distance meets the appropriate predetermined threshold, as indicated by block 112. According to one example, positioning and maintaining the seismic source 24 in-sea at a desired distance from hull 28 may involve initial movement of the seismic source 24 out to the predetermined hull distance 86 via propulsion system 54. When the seismic source 24 is properly positioned at or beyond the distance 86, power and control system 68 maintains the position of seismic source while, for example, the vessel 22 is stationary and/or moving to the next position.

If the hull to source distance 84 is not sufficient according to the predetermined threshold, the power and control system 68 takes appropriate action, such as disabling firing control 90 and preventing firing of seismic source 24, as indicated by block 114. System 68 also may provide an additional annunciation, as indicated by block 116. For example, the system 68 may illuminate warning lights and/or provide warning messages.

On the other hand, if the hull to source distance 84 is sufficient according to the appropriate threshold, power and control system 68 enables the firing of seismic source 24, as indicated by block 118. Upon firing, shock level sensor system 82 provides data to system 68 and this data is used to determine whether the shock levels in hull 28 are within a predetermined threshold, as indicated by decision block 120. As illustrated by block 122, the shock level sensor system 82 may comprise sensor 78 in the form of vibration sensors mounted within hull 28 to provide shock level data. The shock level data is processed by power and control system 68 to determine whether the actual shock loading is within the predetermined threshold, as indicated by block 124.

If the shock levels measured in hull 28 are too high according to the predetermined threshold, the power and control system 68 again takes appropriate action, e.g. disabling firing control 90 and preventing firing of seismic source 24, as indicated by block 114. System 68 may again provide an additional annunciation, as indicated by block 116 and as described above. For example, the system 68 may illuminate warning lights and/or provide warning messages.

Assuming the shock levels acting on hull 28 fall within the predetermined threshold, the firing of seismic source 24 is maintained and a determination is made as to whether the seismic survey has been completed, as indicated by decision block 126. If the seismic survey has not been completed, system 68 continues to monitor whether the predetermined distance threshold and/or predetermined shock level threshold have been detrimentally crossed, as indicated by decision blocks 108 and 120. Once the seismic survey has been completed, system 28 disables further firing of seismic source 24, as again indicated by block 114.

It should be noted the components of seismic system 20 and seismic source system 52 can be adjusted to accommodate a variety of structural, operational, and/or environmental parameters. For example, body 22 may comprise a variety of marine seismic vessels, other types of vessels, or other types of marine structures susceptible to shock loading. A wide variety of seismic sources, including air-guns and other types of seismic sources, may be utilized individually, in clusters, in separated groups, and in other arrangements depending on the parameters of a given seismic profiling operation.

Additionally, power and control system 68 may utilize a variety of processors, e.g. microprocessors, and other control system components, e.g. pumps, valves, manifolds, and other features designed to enable collection of data, processing of data, and control over the positioning of seismic source 24. The physical movement of seismic source 24 may be achieved by many types of propulsion systems 54 coupled to the seismic source 24 through float 55, through another suitable system feature, and/or by direct coupling with seismic source 24. The seismic receivers, seismic acquisition and logging unit, corresponding vessel communication systems, and numerous other components may be adjusted, modified, interchanged, or otherwise adopted to facilitate the methodology described herein.

Although only a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system to facilitate use of seismic sources, comprising:
    a seismic source;
    a propulsion system coupled to the seismic source;
    a distance sensor system to measure distance between the seismic source and a body;
    a shock level sensor system to measure shock levels in the body due to firing of the seismic source;
    a control system to receive data from the distance sensor system and the shock level sensor system, the control system being programmed to automatically stop firing of the seismic source if the data is outside of a predetermined level; and
    wherein the control system sustains the seismic source at a position where the shock level data is below the predetermined level.

2. The system as recited in claim 1, wherein the seismic source comprises a seismic air-gun source.

3. The system as recited in claim 1, wherein the propulsion system comprises a plurality of power thrusters.

4. The system as recited in claim 1, wherein the propulsion system comprises a plurality of water jets.

5. The system as recited in claim 1, wherein the distance sensor system comprises above-sea sensors.

6. The system as recited in claim 1, wherein the distance sensor system comprises in-sea sensors.

7. The system as recited in claim 1, wherein the shock level sensor system comprises at least one sensor mounted on a hull of the body.

8. The system as recited in claim 1, wherein the control system is a computer-based control system located on the body.

* * * * *